Nov. 14, 1939.  S. L. WEISS  2,179,654
FAUCET CONNECTION
Filed June 20, 1938   2 Sheets-Sheet 1
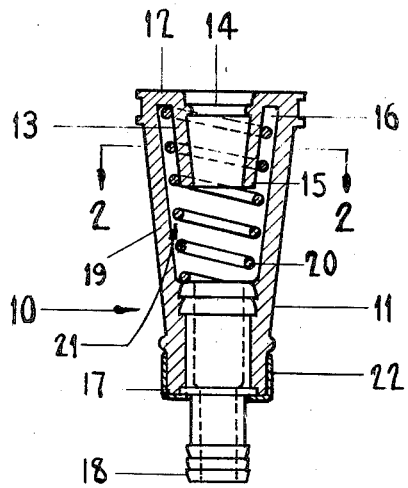
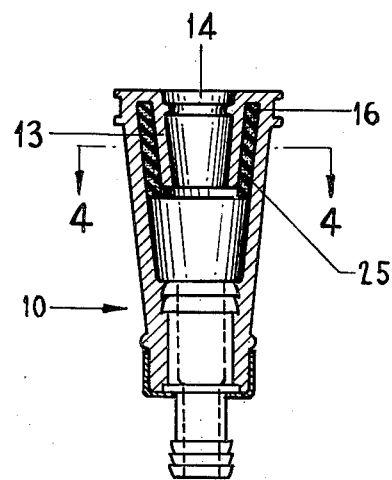
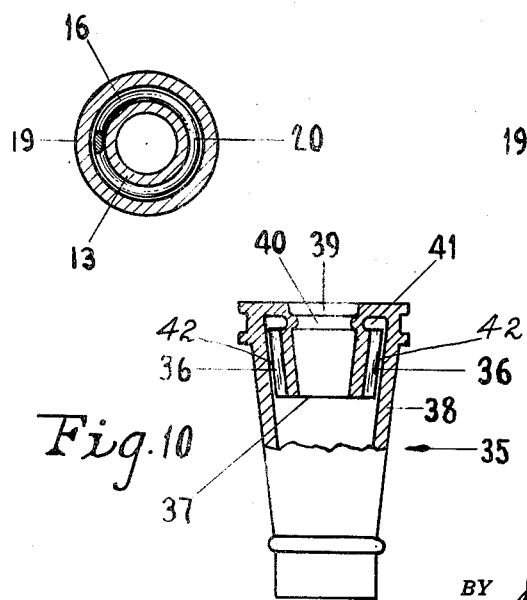
SAMUEL L. WEISS
INVENTOR.
BY *Joseph Blacker*
ATTORNEY.

Nov. 14, 1939.　　　S. L. WEISS　　　2,179,654
FAUCET CONNECTION
Filed June 20, 1938　　　2 Sheets-Sheet 2
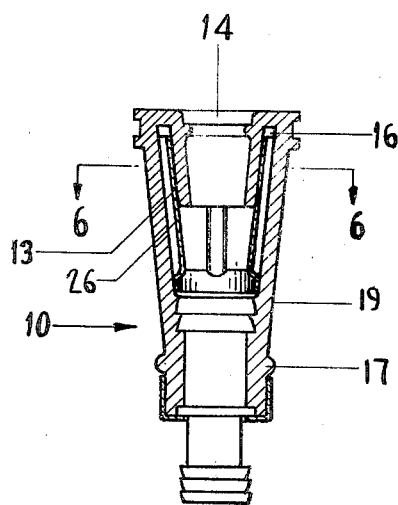
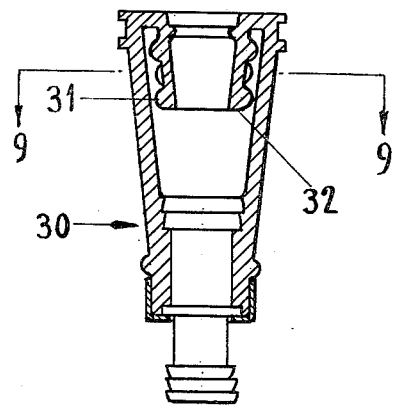
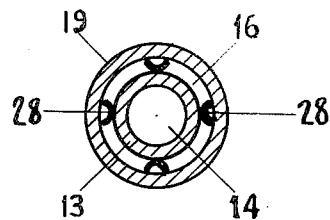
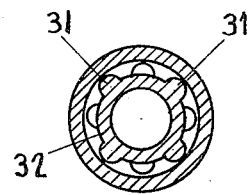
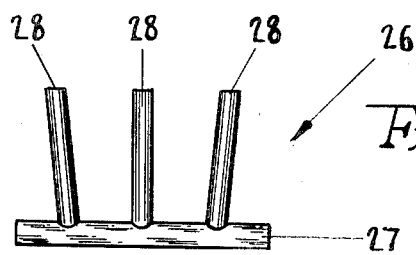
SAMUEL L. WEISS
*INVENTOR.*
BY *Joseph Blacker*
ATTORNEY.

Patented Nov. 14, 1939

2,179,654

UNITED STATES PATENT OFFICE 2,179,654

FAUCET CONNECTION

Samuel L. Weiss, Brooklyn, N. Y.

Application June 20, 1938, Serial No. 214,771

2 Claims. (Cl. 285—90)

This invention relates to a faucet connection for attaching rubber tubes or garden hose to a faucet. This application is an improvement on the disclosure shown in my prior Reissue Patent Number 20,593, dated December 14, 1937.

An object of this invention is to provide highly improved gripping means in faucet connections used for hydraulic purposes, wherein the pressure of the fluid passing through will act with maximum efficiency in conjunction with the elastic nature of the connection to automatically perform the function of a grip upon the faucet nozzle.

Another object of this invention is to provide in a faucet connection comprising a rubber body having an outer shell and a sleeve positioned in annular spaced relation in the shell, spacing means in the annular space between the sleeve and shell for maintaining the spaced relation of said sleeve and shell, the said spacing means being adapted to only partly close the annular space so as to permit the water to enter all around the annular space for augmenting the gripping power of the faucet connection on the faucet nozzle all around its periphery.

Another object of this invention is to provide a filling member which is insertable into the annular space between the sleeve and shell of existing faucet connections, that is, faucet connections which do not have spacing means between the shell and sleeve, the said filling member being designed to only partly close the annular space and which will be adapted to open up radially when the inner sleeve is stretched and which will provide entrance all around the periphery of the sleeve into which the water may enter the annular space and permit the hydraulic pressure to augment the gripping power of the faucet connection on the faucet nozzle all around its periphery and with a maximum gripping pressure under all service conditions.

It has been found in practice that when a faucet nozzle of large external diameter is inserted into the annular tapering sleeve, that when the nozzle reaches the lower end portion of the sleeve, the walls of the sleeve at this point may be stretched to such an extent as to completely close the entrance into the annular space. This closing of the lower end portion of the annular space prevents the water from entering the said space and prevents the water pressure from augmenting the grip of the sleeve on the nozzle.

In my prior patent for faucet connection I have shown a plurality of longitudinal ribs which connect the sleeve and the inner surface of the outer shell so that they are constantly maintained in an annularly spaced relation and prevent the choking off of the annular space. I have found, however, that when using five ribs, that the cross-sectional areas of the said ribs materially reduce the area of the annular space and this reduces the area on which the water pressure can act for nozzle gripping purposes. In the present disclosures I have provided spacing means which are not attached to the sleeve and the inner surface of the outer shell so that the outer shell can move away all around its periphery from the outer surface of the sleeve and I thereby secure the maximum gripping power on the faucet nozzle.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a longitudinal sectional view of a faucet connection having one form of my invention in the form of a coil spring applied therein.

Figure 2 is a cross-sectional view, the section being taken as on line 2—2 in Figure 1.

Figure 3 is a longitudinal sectional view of a faucet connection comprising spacing means made of a material having interstices between the tissues thereof.

Figure 4 is a cross-sectional view, the section being taken as on line 4—4 in Figure 3.

Figure 5 is a longitudinal sectional view of a faucet connection having applied therein a spring which may be rolled into circular form.

Figure 6 is a cross-sectional view, the section being taken as on line 6—6 in Figure 5.

Figure 7 is a plan view of the spring shown in Figures 5 and 6, before rolling into circular form.

Figure 8 is a longitudinal cross-sectional view of a modified faucet connection having spacing means in the form of bosses which are integral with only the outer surface of the sleeve.

Figure 9 is a cross-sectional view, the section being taken as on line 9—9 in Figure 8.

Figure 10 is a longitudinal cross-sectional view, partly in elevation, of a modified faucet connection having spacing means in the form of ribs which are integral with only the outer surface of the sleeve.

In the drawings shown in Figures 1 and 2, the numeral 10 indicates a faucet connection comprising a hollow tubular body or outer shell 11 which is made of molded rubber, the rubber being slightly stiffened while retaining its elasticity.

As shown in Figure 1, the upper end of the body 11 has an inwardly extending annular flange 12 and an integral downwardly extending sleeve 13. The bore 14 of the sleeve 13 is made tapering with the smaller end 15 of the taper extending downwardly. The sleeve is not attached at its lower end to the outer shell 11 and is free to flex within the annular channel 16 surrounding it. The sleeve is thus free to adapt itself to different sizes of faucet nozzles as well as to different shapes of nozzles which may be entered into the bore 14.

The lower or discharge end 17 of the outer shell 11 may be provided with a screw threaded adapter (not shown) or with a beaded adapter 18 to facilitate its connection to a tube or hose having a screw threaded sleeve at one end, as is well known in the art.

The wall thickness of the sleeve 13 and of the annular flange 12 is the same as that of the upper wall 19 of the body 11. While the bore 14 of the sleeve 13 tapers downwardly, the wall thickness of the sleeve is constant.

As is well known in the art, under operating water pressure conditions, the water pressure within the channel 16 of the shell 11 reacts against the elastic sleeve 13 and clamps the sleeve against the faucet nozzle.

It is to be noted that when a faucet nozzle of large external diameter is inserted into the internally tapering sleeve that when the said nozzle reaches a point in the sleeve where the cross-section is smaller than the outer diameter of the nozzle, the walls of the sleeve at this point will be stretched to such an extent as to completely close the entrance into the annular space. This closing of the lower end portion of the annular space prevents the water from entering the annular space and prevents the water pressure from augmenting the grip of the sleeve on the nozzle.

The several embodiments herewith disclose means for preventing the closure of the entrance into the channel 16. As shown in Figures 1 and 2, I have provided a coil spring 20 having a tapering contour corresponding to the shape of the channel 16. The spring may be inserted into the channel by stretching and enlarging the lower end portion 17 of the body 11 to permit passage therethrough of the spring. The internal contour of the spring 20 is made to fit the outer wall of the tapering sleeve 13. The outer contour of the spring 20 is preferably of smaller diameter than the inner diameter of the wall 19 to provide a clearance space 21 between the coils of the spring and the said wall and so that the water in the annular channel 16 will circumscribe the entire surface area of the sleeve 13 and will exert its maximum gripping power on a faucet nozzle on which the connection 10 may be mounted. The spring 20 may be made of spring brass wire having a limited resiliency and so that entrance of a nozzle into the sleeve 13 will easily cause radial distension of the spring.

The coil spring embodiment shown in Figures 1 and 2 is a spacing means which may be inserted in the annular space between the sleeve and outer shell for maintaining the spaced relation of the sleeve and shell. This spring may be inserted in any suitable manner in existing faucet connections, such as by stretching and enlarging the lower end portion 17 to permit passage inward for the spring. This stretching operation may be done before the metallic ferrule 22 is placed on the lower end portion 17 of the outer shell 11.

In Figures 3 and 4 I have shown a modified spacing means 25 inserted into the annular channel 16 of the faucet connection 10. The spacing means 25 is preferably made of sponge rubber having interstices between the tissues which permit the water to pass through from the lower to the upper ends of the channel 16 and permit the water pressure to augment the grip of the sleeve 13 on a nozzle inserted into the bore 14.

In Figures 5, 6 and 7 I have shown a modified spacing means 26 inserted into the annular channel 16 of the faucet connection 10. The spacing means 26 is preferably made of thin flat spring brass and punched therefrom by means of dies and comprises a narrow connecting strip 27 having integrally connected arms 28. The arms 28 are equally spaced apart and permit the strip 27 of the spring 26 to be rolled into circular form small enough for passage through the lower end 17 of the faucet connection 10 when the said end is stretched apart.

As shown in Figure 6, each arm 28 is pressed into an arcuate cross-sectional form so as to simultaneously contact the inner surface of the outer shell 19 and the outer surface of the sleeve 13. Entrance of a nozzle into the bore 14 of larger diameter than the bore will cause radial distension of the spring 26 and of the outer shell 19, leaving free passageway for the water into the channel 16.

In Figures 8 and 9 I have shown a modified faucet connection 30 having spacing means in the form of semi-spherical projections 31 which are integral with the outer surface of the sleeve 32. As best shown in Figure 8, the projections are spaced considerably apart in different planes. The projections in successive planes are in staggered relation.

In Figure 10 I have shown a modified faucet connection 35 having spacing means in the form of ribs 36 which are integral with the outer surface of the sleeve 37. The ribs 36 are separated from the outer shell 38 and may be co-extensive with the height of the sleeve. Entrance of a nozzle into the bore 39 of larger diameter than the bore will cause radial distension of the sleeve 37 and the integral ribs 36 will move radially and distend the outer shell 38 correspondingly. The width of the channel between the sleeve and outer shell is thus maintained constant. When water enters the said channel it is free to expand the outer shell and enters all around the outer periphery of the sleeve and also around the ribs and exerts its maximum pressure against the sleeve. The sleeve then grips a nozzle inserted therein with the maximum possible pressure.

I may mold cylindrical openings 42, Figure 10, between the ribs and shell and co-extensive with the sleeve to provide non-collapsible openings for the water.

The structure shown in Figure 10 provides a normally open cylindrical opening between the longitudinal ribs 36 and the outer shell. This opening is co-extensive with the length of the sleeve and permits stretching of the sleeve before the water is turned on without stretching the outer shell.

As shown in the drawings, I have provided an annular bead at the upper elevation of the inner surface of the sleeve. As best shown in Figure 10, the bead 40 is substantially in alinement with an annular recess 41. The recess 41 is preferably positioned at the upper elevation of the ribs 36 resulting in a reduced wall thickness of the sleeve at the annular bead thus increasing the flexibility at the annular bead, and so that the water pressure will more readily exert its force for augmenting the grip of the beaded element on a faucet nozzle.

While I have shown my faucet connections as equipped with nipples designed for attachment to bath spray hose, I may use the faucet connections for water straining or other purposes by inserting suitably perforated disks (not shown) at the lower end of the connections.

In accordance with the patent statutes I have described and illustrated the preferred embodiments of my invention, but it will be understood that various changes and modifications can be made therein without departing from the scope of the invention as defined by the appended claims.

I claim:

1. In a detachable coupling for securely connecting a hose to a faucet, comprising a rubber body having an outer shell and a sleeve positioned in annularly spaced relation in said shell, means in said annular space for maintaining said spaced relation of said shell and sleeve, said spacing means being longitudinally positioned and being substantially co-extensive with said sleeve and adapted for radial movement simultaneously with radial movement of said sleeve, said outer shell being free to expand and assume a position separated from said sleeve and from said separating means, said expanded position of said outer shell forming a complete annular chamber for liquid under pressure circumscribing said separating means and causing said sleeve to grip said faucet nozzle and augment the gripping power of the faucet connection on the faucet nozzle all around its periphery and with a maximum pressure all along its length.

2. In a detachable coupling for securely connecting a hose to a faucet, comprising a rubber body having an outer shell and a sleeve positioned in annularly spaced relation in said shell, means in said annular space for maintaining said spaced relation of said shell and sleeve, said spacing means being longitudinally positioned and being substantially co-extensive with said sleeve and adapted for radial movement simultaneously with radial movement of said sleeve, said outer shell being free to expand and assume a position separated from said sleeve, said expanded position of said outer shell forming a complete annular chamber for liquid under pressure circumscribing said separating means and causing said sleeve to grip said faucet nozzle and augment the gripping power of the faucet connection on the faucet nozzle all around its periphery and with a maximum pressure all along its length.

SAMUEL L. WEISS.